US010415542B2

(12) United States Patent
Rohden

(10) Patent No.: US 10,415,542 B2
(45) Date of Patent: Sep. 17, 2019

(54) MOUNTABLE WING TIP DEVICE FOR MOUNTING ON A ROTOR BLADE OF A WIND TURBINE ARRANGEMENT

(71) Applicant: YOUWINENERGY GmbH, Oldenburg (DE)

(72) Inventor: Rolf Rohden, Aurich (DE)

(73) Assignee: YOUWINENERGY GmbH, Oldenburg (DE)

(*) Notice: Subject to any disclaimer, the term of this patent is extended or adjusted under 35 U.S.C. 154(b) by 387 days.

(21) Appl. No.: 14/902,903

(22) PCT Filed: Jul. 4, 2014

(86) PCT No.: PCT/EP2014/064337
§ 371 (c)(1),
(2) Date: Jan. 5, 2016

(87) PCT Pub. No.: WO2015/001090
PCT Pub. Date: Jan. 8, 2015

(65) Prior Publication Data
US 2016/0153424 A1    Jun. 2, 2016

(30) Foreign Application Priority Data

Jul. 5, 2013   (EP) .................................... 13175405

(51) Int. Cl.
F03D 1/06    (2006.01)
F03D 9/25    (2016.01)

(52) U.S. Cl.
CPC ......... *F03D 1/0633* (2013.01); *F03D 1/0641* (2013.01); *F03D 1/0658* (2013.01);
(Continued)

(58) Field of Classification Search
CPC .... F03D 1/0633; F03D 1/0641; F03D 1/0658; F03D 1/0675; F03D 1/0683; F03D 9/25;
(Continued)

(56) References Cited

U.S. PATENT DOCUMENTS 7,566,203 B2 * 7/2009 Moser .................. F03D 1/0633
416/235
2009/0084904 A1    4/2009 Detert
(Continued)

FOREIGN PATENT DOCUMENTS

DE            830 627 C     2/1952
DE       203 01 445 U1     6/2004
(Continued)

OTHER PUBLICATIONS

International Search Report cited in PCT/EP2014/064337, dated Aug. 12, 2014, 3 pages.
(Continued)

*Primary Examiner* — Christopher Verdier
(74) *Attorney, Agent, or Firm* — Rothwell, Figg, Ernst & Manbeck, P.C.

(57) ABSTRACT

A mountable wing tip device (102) for mounting on a rotor blade of a wind turbine is disclosed which comprises a forward extremity (106) and at least two rearward extremities (108A, 108B, 112), wherein the forward extremity (106) and the at least two rearward extremities (108A, 108B, 112) are triangularly arranged, a leading edge region extending between the forward extremity (106) and the at least two rearward extremities (108A, 108B, 112), and a trailing edge region extending between the rearward extremities (108A, 108B, 112), a root region (113) at which the wing tip device (102) is mountable on an end of the rotor blade, wherein the root region (113) is positioned between the leading edge region and the trailing edge region.

21 Claims, 7 Drawing Sheets

(52) U.S. Cl.
CPC ............ *F03D 1/0675* (2013.01); *F03D 9/25* (2016.05); *F05B 2240/30* (2013.01); *F05B 2240/302* (2013.01); *F05B 2250/11* (2013.01); *Y02E 10/721* (2013.01)

(58) Field of Classification Search
CPC ............... Y02E 10/721; F05D 2240/30; F05D 2240/301; F05D 2240/302; F05D 2250/11; F05B 2240/30; F05B 2240/301; F05B 2240/302; F05B 2250/11
USPC ...... 416/62, 231 B, 227 R, 227 A, 228, 235, 416/236 R, 236 A, 237
See application file for complete search history.

(56) References Cited

U.S. PATENT DOCUMENTS

| | | | |
|---|---|---|---|
| 2011/0070090 A1* | 3/2011 | Hugues | B64C 23/065 416/223 R |
| 2011/0081247 A1* | 4/2011 | Hibbard | F03D 1/0675 416/226 |
| 2012/0063909 A1* | 3/2012 | Bottome | F01D 5/14 416/228 |
| 2012/0080969 A1* | 4/2012 | Eriksen | H02K 1/2786 310/77 |
| 2012/0269643 A1* | 10/2012 | Hibbard | F03D 1/0675 416/226 |

FOREIGN PATENT DOCUMENTS

| | | |
|---|---|---|
| EP | 2416005 A1 | 2/2012 |
| GB | 2 067 493 A | 7/1981 |
| GB | 2175351 A | 11/1986 |
| WO | 2012/007358 A1 | 1/2012 |

OTHER PUBLICATIONS

Office Action dated Nov. 17, 2016 issued in the corresponding European patent applicatoin No. 13 175 405.3, 6 pages.
Office Action dated May 21, 2019, issued in the corresponding European patent application No. 14 742 162.2, 6 pages.

* cited by examiner

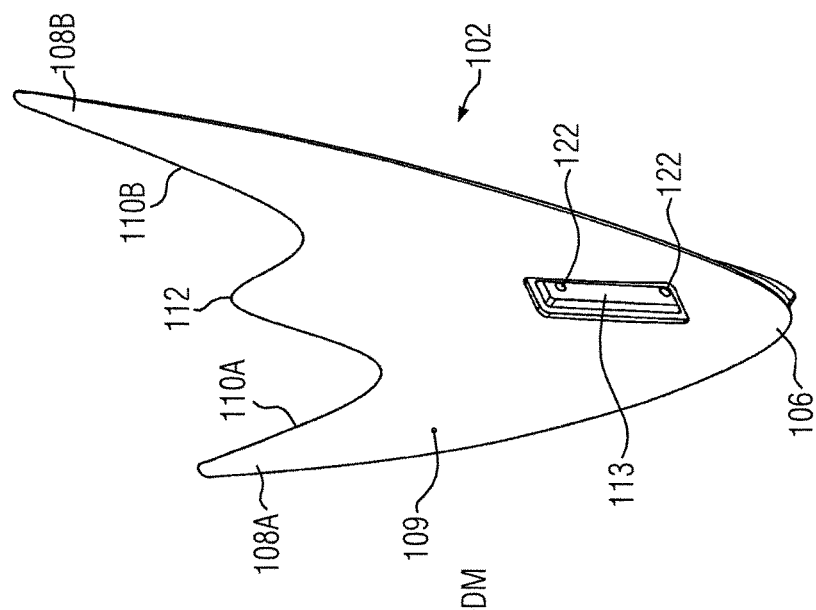
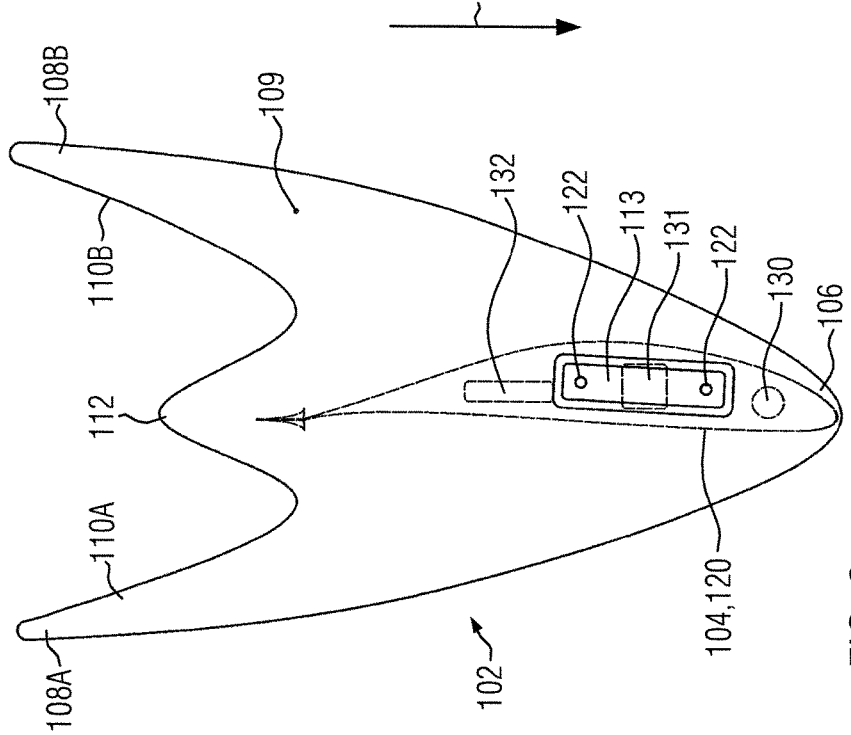
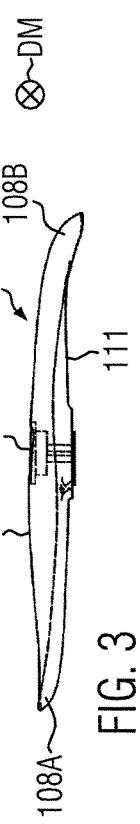
FIG. 1
FIG. 2
FIG. 3

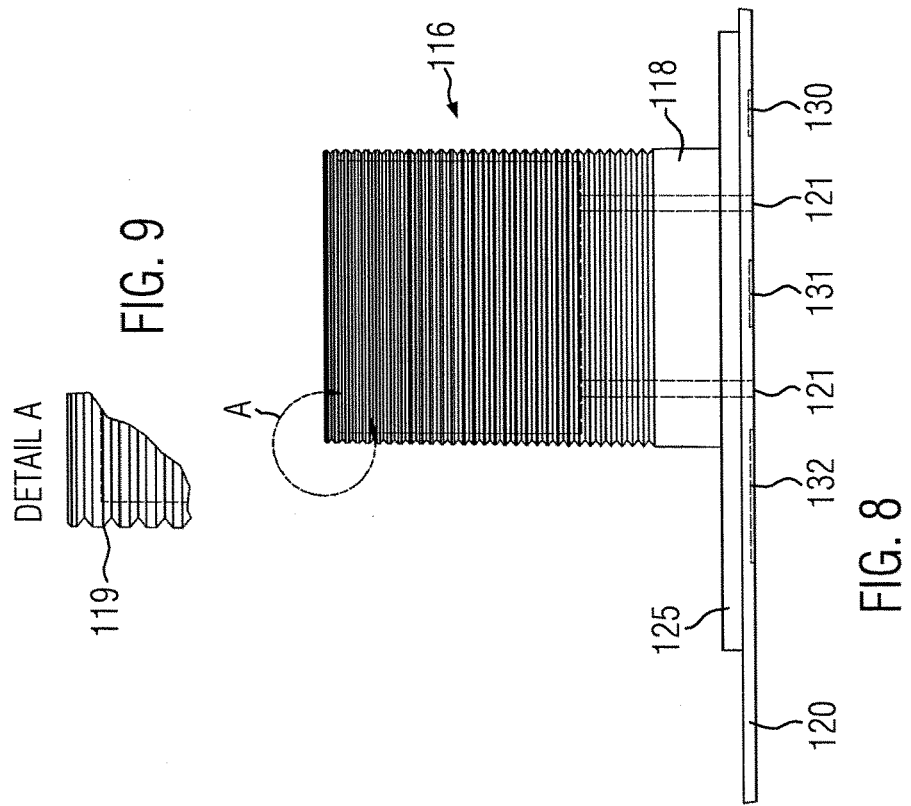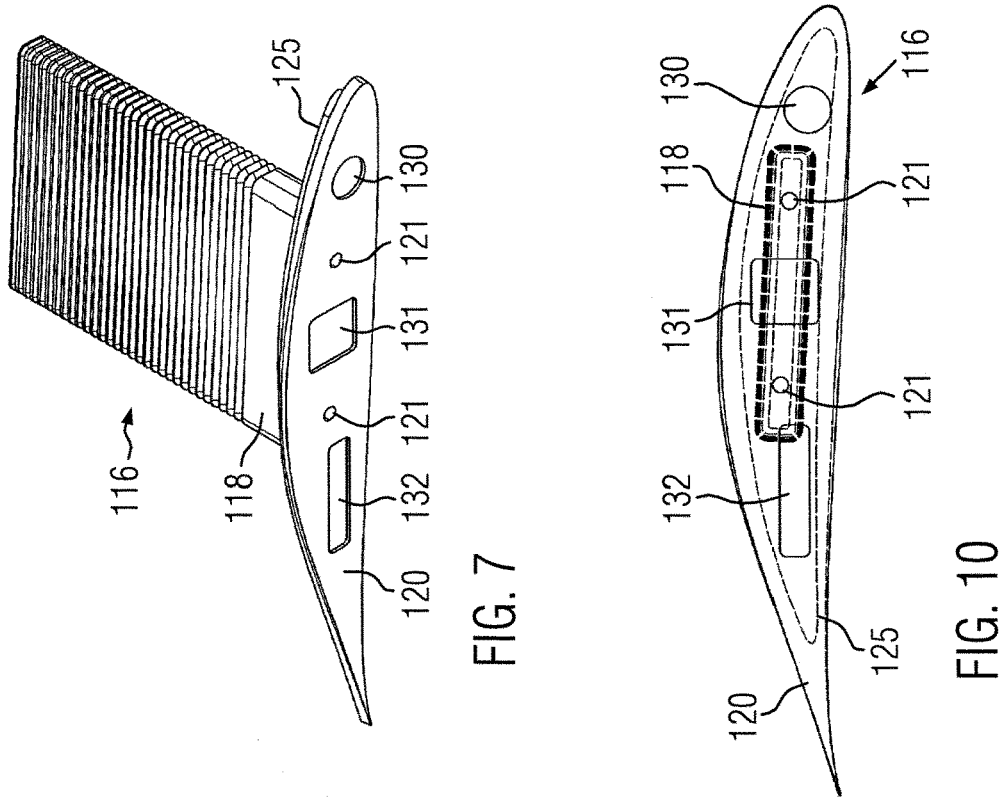

MOUNTABLE WING TIP DEVICE FOR MOUNTING ON A ROTOR BLADE OF A WIND TURBINE ARRANGEMENT

CROSS REFERENCE TO RELATED APPLICATION

This application is a 35 U.S.C. 371 National Phase Entry Application from PCT/EP2014/064337, filed Jul. 4, 2014, which claims the benefit of European Patent Application No. 13175405.3 filed on Jul. 5, 2015, the disclosures of which are incorporated by reference in their entirety.

BACKGROUND OF THE DESCRIPTION

The present subject matter relates to a mountable wing tip device, a blade tip assembly and a wind turbine arrangement.

In a commonly known wind turbine assembly, a rotor blade of a rotor component converts wind energy to low speed rotational energy. Such a rotor blade is connected to a generator positioned in a hub of the wind turbine assembly, wherein the hub is arranged in order to drive the generator while the rotor blade converts wind energy. Opposite to the end of the rotor blade arranged at the hub, the rotor blade comprises a free end which oscillates due to the mixture of the air flow from the pressure and suction side of the rotor blade.

Typically, a rotor blade is designed to be broader near a root portion and narrower towards a tip portion of the rotor blade wherein the tip portion comprises the free end of the rotor blade. As also known, for some of the prevalent rotor blade designs, the blade tip region is characterized by the region extending from the blade tip to about one-third of the length of the entire rotor blade. As would be appreciated by a person skilled in the art, the blade tip region contributes to the majority of the wind energy captured by the rotor blades. In some designs, nearly 70% of the wind energy is captured through the blade tip region.

Since a large extent of the wind energy is captured through the blade tip region (which in turn extends over a smaller portion of the entire rotor blade), any losses that may be occurring due to physical attributes of the blade tip region would tend to have a profound effect on the overall wind energy capture efficiency of the rotor blade. Thus, it is preferred to minimize losses occurring in the blade tip region.

One of the losses which are present in the blade tip region occurs primarily due to the axial direction which the airflow assumes as it flows over the rotor blade. In operation, the incoming winds are incident onto a leading edge region of the rotor blades. Normally, the airflow is such that it flows in a regular manner, from the leading edge region towards the sharper trailing edge region, along a direction which is perpendicular to the axis of the rotor blade. As one moves along the length of rotor blade towards the tip, owing to the sharp edge at the rotor blade tip, the airflow has a tendency to assume an axial flow, i.e. along a direction which is parallel to the axis of the rotor blade. Due to such non-regular airflow along the blade tip region, aerodynamic losses are introduced which in turn reduce the lift-to-drag efficiency of the rotor blade. In addition, the tip of the rotor blade may also produce tip vortices which in turn contribute to the reduced lift-to-drag ratio for the rotor blade.

To reduce the drag, the tip of the rotor blades of the modern wind turbines may be curved to form blade tips. As a result of the curved blade tip, the resulting drag produced due to the axial airflow can be reduced. However, despite the curved tip of the rotor blades, an aerodynamic short-circuit between a pressure side and a suction side of the rotor blade might occur. Further, as per conventional design, the blade tip can be a part or an extension of the rotor blade and is machined along with the rotor blade itself. Such designs however do not address the losses that occur due to the formation of the vortices.

The special design of the blades, i.e. the curved rotor blades, may also require additional consideration in transportation and assembling at the assembly site. As mentioned previously, any small perturbations in the structure of the rotor blades may have substantial effect on the efficiency of the rotor blades. It may therefore be understood that the design of the rotor blades has to be precise and free from defects. Since the shape and design of such blades are required to be precise, any damage occurring due to wear and tear either during operation or during transportation will also have effect on the efficiency of the blade.

In cases where the blade tip is part of the rotor blades, it is very likely that the blade tips may get damaged during transportation. Also, if the blade tips suffer damage in the course of their operation, or due to natural occurrences such as lightening, the entire rotor blade has to be replaced. This further is likely to increase the operational costs associated with the wind turbine.

In addition, it may be inconvenient and time-consuming to perform any checks on the blade tips, once the wind turbine is operational. Further, since the blade tips typically extend either towards the suction side or the pressure side of the rotor blade, this may cause imbalance when the wind turbine is in operation, thereby causing vibrations in the wind turbine.

SUMMARY

The present subject matter relates to a mountable wing tip device for mounting on a rotor blade of a wind turbine arrangement having a structure which reduces rotor blade friction and drag.

According to an embodiment of the subject matter, a mountable wing tip device comprises a forward extremity and at least two rearward extremities, wherein the forward extremity and the at least two rearward extremities are triangularly arranged. Preferably a leading edge region extends between the forward extremity and the at least two rearward extremities, wherein more preferably a trailing edge region extends between the rearward extremities. Further, the mountable wing tip device comprises a root region at which the wing tip device is mountable on an end of a rotor blade, wherein the root region is positioned between the leading edge region and the trailing edge region.

The concept underlying this device is completely novel and provides various advantageous effects. In particular, according to the basic concept of the present subject matter, the present invention provides a rotor blade which can benefit from the drag reduction afforded by the wing tip device whilst not suffering to great on increase in bending moment in the rotor blade, particularly at the root of the rotor blade at which the blade is connected to a hub of a wind turbine. Preferably the bending moment in the rotor blade, in particular at the hub, during use is, in fact, reduced by the presence of the wing tip device. Further, an aerodynamic short-circuit between a pressure and a suction side of the rotor blade can be prevented by using the concept of the inventive device as due to the present subject matter the losses that occur due to the formation of the vortices at the blade tip can be reduced. Thus, a laminar flow of wind across the rotor blade can be provided, thereby reducing drag that is caused due to short circuit between the suction side and the pressure side of the rotor blade.

According to an aspect of the present subject matter, a mountable wing tip device is simplified and easy to use, wherein the operational safety is also enhanced. Moreover, a special shaping of the end of a rotor blade which increases production costs is not required as the mountable wing tip device is mountable before installing the rotor blade to a hub of a wind turbine. Further, it is also possible to install the mountable wing tip device after a rotor blade is mounted to a hub. Therefore, according to the basic concept of the present subject matter, the mountable wing tip device has the function of reducing drag and friction of a rotor blade, and also, has the function of reducing costs with regard to mounting and producing a rotor blade with a wing tip device. Also the damages can be avoided as the wing tip device and the rotor blade can be separately transported to the construction side. Further, the mountable wing tip device and the rotor blade can be transported in separate containers in a safe manner thereby minimizing the likelihood that the components will be damaged during transportation. In one implementation, the blade portion can be transported affixed to the rotor blades, onto which the wing tip device can be mounted at the time of assembly. At the construction site, the rotor blade and the wing tip device are connected. Accordingly, the wing tip device of the present subject matter can be easily installed at the rotor blade at the construction site. Further, in case of any damage to the tip portion, the entire rotor blade may not be required to be replaced and just the wing tip device may be changed. This may help in saving time and effort.

According to an embodiment of the present subject matter, the forward extremity and the at least two rearward extremities are arranged in a triangle.

Preferably the triangle comprises either sides which all have the same lengths (equilateral triangle) and in which all angles measuring 60 degree or an isosceles triangle having two sides which are equal in length. An isosceles triangle also has two angles of the same measure, namely the angles opposite of the two sides of the same length which are preferably defined by the forward extremity and one rearward extremity. Such a described form is similar to a so called sweep back of a plane's wing which is optimized for airflow when moving.

According to an embodiment of the present subject matter, the leading edge region comprises a V-shape. Thus, the leading edge region extending between the forward extremity and the at least two rearward extremities comprises a shape which is similar to a triangle. In comparison to the arrangement mentioned before it is possible that the length between one rearward extremity and the forward extremity differs from the length of the forward extremity and another rearward extremity.

According to an embodiment of the present subject matter, the leading edge region comprises an arced tip portion at the forward extremity. Due to the arced design the aerodynamicity of the mountable wing tip device can be enhanced. Also, the flow conditions at the forward extremity are optimized with regard to friction and drag.

According to an embodiment of the present subject matter, the thickness of the airfoil comprises a maximum between the forward extremity and a rearward extremity. This reduces drag of the mountable wing tip device and thus also enhances the efficiency in reducing friction. In other words, the mountable wing tip device comprises its largest thickness in the region of the forward extremity and, the thickness at the forward extremity is reduced while extending into the direction of the region of the rearward extremity. Further, the thickness of the airfoil varies along the chord line which is a straight line connecting the leading and trailing edges of the airfoil. In this application under the term "airfoil" it is to be understood a profile of a rotor blade which has a thickness and shape while extending from the leading edge to the trailing edge.

Preferably the thickness of the airfoil varies from thin to thick and subsequently to thin. Advantageously the airfoil comprises a thin beginning at the leading edge and the forward extremity, respectively, which expands to a thick area of the leading edge. Subsequently, it is preferred that the airfoil gets thin while extending to the trailing edge.

According to an embodiment of the present subject matter, the maximum thickness of the airfoil is closer to the forward extremity than to a rearward extremity. This allows an optimal flow around the wing tip device and improves noise reduction of the wing tip device.

According to an embodiment of the present subject matter, the forward extremity and one rearward extremity of the wing tip device are arranged on a connection line, and wherein the airfoil comprises a minimum in thickness between the leading edge region and the connection line. This means, that the thickness of the airfoil from the leading edge region to trailing edge region varies. Having a triangle in mind wherein the forward extremity and two rearward extremities are the corners of this triangle and wherein the forward extremity and one rearward extremity are arranged on a connection line, the airfoil of the mountable wing tip device has its smallest thickness in the region between the line and a rearward extremity which is not positioned on the connection line.

According to an embodiment of the present subject matter, the airfoil comprises a minimum in thickness between two adjacent rearward extremities. This adds a further variation in thickness wherein the thickness from a rearward extremity to another rearward extremity is thick-thin-thick. This means that in the middle of two rearward extremities a minimum in thickness is positioned.

According to an embodiment of the present subject matter, the mountable tip device comprises three rearward extremities. Thus, the wing tip device comprises the shape of a polygon having four points and four edges, respectively. Hence, an optimized shape with regard to friction and drag can be obtained.

According to another embodiment of the present subject matter, the trailing edge region comprises a "W"-shape having three rearward extremities. Such a shape allows a predefined mixture of the both sides of an airflow flowing around the profile and airfoil, respectively, of the wing tip device. Also the stability of the wing tip device is enhanced while moving in the airflow.

According to an embodiment of the present subject matter having at least two extremities, the forward extremity and one rearward extremity of the wing tip device are arranged in a main plane. Preferably two farther rearward extremities are inclined away from the main plane. This means that a main plane in which the forward extremity and one rearward extremity are positioned comprises no further extremity of the wing tip device. Instead two further rearward extremities are positioned such with regard to the main plane that these rearward extremities are not positioned into the main plane. In other words, the two further rearward extremities are inclined away from the main plane or elevated and rise, respectively, from the main plane.

To put it another way, it is preferred that at least one rearward extremity is inclined away from the main plane. To be inclined away from the main plane means that the rearward extremity and extremities, respectively, are at least partially outside of the main plane. In other words, the rearward extremities are not positioned within the main plane.

According to an embodiment of the present subject matter, two rearward extremities displaced at opposing ends of the trailing edge are inclined in opposite directions with respect to the main plane. This means that with regard to the main plane in which the forward extremity and one rearward extremity are positioned, one further rearward extremity inclines to the right or upward whereas the other rearward extremity inclines to the left or downward with regard to the main plane. Such a shape reduces drag and friction loss caused by airflow flowing around the wing tip device.

According to an embodiment of the present subject matter, at least one rearward extremity is inclined with respect to a plane spanned by two other rearward extremities and the forward extremity. In accordance to the mathematical definition of a plane, three points in a three-dimensional coordinate system define a plane. Two of these three points are formed by the rearward extremities and one point is formed by the forward extremity. In such a spanned plane and according to the aforementioned definition, a further rearward extremity is not positioned in such a plane. In other words, a plane of the profile of the wing tip device defined by a forward and two rearward extremities curves towards a fourth rearward extremity which is not positioned in the aforementioned plane.

According to another aspect of the invention a blade tip assembly comprises a blade portion and a mountable wing tip device.

According to an embodiment of the present subject matter, the blade portion comprises a blade connecting portion which connects the blade portion to a rotor blade. Preferably the blade connecting portion is in the shape of elliptical cylinder. Also a cylinder having the shape of a polyhedral is possible. Advantageously the shape and profile, respectively, of the blade connecting portion fits into a rotor blade of a wind turbine arrangement.

According to an embodiment of the present subject matter, the blade portion comprises a wing tip connecting portion which connects the blade portion to the mountable wing tip device. Such an assembly provides an enhanced stability and opens the possibility of mounting the mountable wing tip device via the blade tip assembly to a wind turbine arrangement.

According to an embodiment of the present subject matter, the blade connecting portion comprises a rough surface, in particular grooves for facilitating alignment of a rotor blade of a wind turbine with a wing tip device. A rough surface is preferred in particular if a rotor blade is made of a fiber-reinforced plastic having woven carbon filaments. Such a rough surface has a high surface area which provides an enhanced basis for connection of the rotor blade with the blade connecting portion, in particular if the rotor blade is also made of a fiber-reinforced plastic.

According to an embodiment of the present subject matter, the blade connecting portion comprises two ends. One end being mounted at the root region of the mountable wing tip device and the other end being insertable and mountable at a rotor blade. Thus, an easy and fast installation of a wing tip device is possible. Such a fast installation saves costs and allows replacing the wing tip device after damage.

According to an embodiment of the present subject matter, the blade connecting portion comprises at least one extension part of a rotor blade. Preferably the shape of the extension part comprises a similar shape as the rotor blade. More preferably the shape of the extension part is adapted to the shape of the rotor blade. Thus, an optimal adaption to the profile of the rotor blade is possible as profiles of both can be adapted in accordance to their shape.

According to an embodiment of the present subject matter, the blade connecting portion extends through the mountable wing tip device and includes means for clamping the mountable wing tip device towards an end of a rotor blade of a wind turbine when mounted. Due to this attachment a highly reliable mechanical attachment of the wing tip device to an end of the rotor blade is possible. Further, in case of repair of the mountable wing tip device it is only necessary to unlock the detachable wing tip device which is only clamped to a surface of the rotor blade. Such a clamping which can be realized by screws gives an easy and fast way to replace a damaged wing tip device without demounting the whole rotor blade. The means for clamping could be e.g. screws which rigidly attach the wing tip assembly against the tip of a rotor blade.

According to a further aspect of the invention a wind turbine arrangement comprises a rotor hub being coupled with at least one rotor blade, a generator having a rotor on the stator, the rotor having mounted the rotor hub and being rotateably supported on the stator, the rotor blade comprises a suction side and a pressure side. Further, the wind turbine arrangement comprises a blade tip assembly comprising the features as discussed above and a mountable wing tip device having also the features as previously discussed.

According to an embodiment of the present subject matter, the mountable wing tip device is mounted to the end of the rotor blade such that one of the rearward extremities inclines towards the suction side of the rotor blade and another one of the rearward extremities inclines towards the pressure side of the rotor blade. More preferably, the mountable wing tip device protrudes and projects, respectively, the rotor blade so that one rearward extremity inclines towards the pressure side and the other one towards the suction side of the rotor blade. Thus, the wing tip assembly extends towards both sides of a rotor blade which allows the suction side as well as the pressure side of the wing tip device to reduce friction and drag. Further, also friction and drag is reduced on both sides of the rotor blade, in particular on the suction and the pressure side. This applies also for the region in which the airflow of the suction side meets the airflow of the pressure side causing normally drag.

According to an embodiment of the present subject matter, a rearward extremity extends towards the suction side of the rotor blade and a further rearward extremity extends towards to the pressure side of the rotor blade. This means that a rearward extremity allows the reducing of drag and a smooth transition of the pressure-side-airflow to the suction-side-airflow. This reduces rotor blade friction and drag which means that the efficiency of a wind turbine arrangement can be optimized.

According to an embodiment of the present subject matter, a forward extremity is oriented into the direction of movement of the wing tip device, wherein the at least two rearward extremities are oriented opposite to the direction of movement of the wing tip device. Thus, the mountable wing tip device is oriented such that the wind and the airflow, respectively, flow against the forwards extremity and the leading edge region, respectively. Subsequently, the wind flows around the airfoil of the wing tip device and flows off at the trailing edge region.

BRIEF DESCRIPTION OF THE DRAWINGS

FIG. 1 shows the mountable wing tip device according to an embodiment in a three-dimensional view;
FIG. 2 shows the mountable wing tip device according to an embodiment in a top-view;
FIG. 3 shows the mountable wing tip device from behind which means opposite to a direction of movement;
FIG. 7 shows a blade portion of a blade tip assembly in a three-dimensional view according to an embodiment;
FIG. 8 shows a side view of a blade portion of a blade tip assembly;
FIG. 9 shows detail A of FIG. 8;
FIG. 10 shows a rotor blade in which a blade portion can be inserted.

DESCRIPTION OF THE EMBODIMENTS

Figure 4:
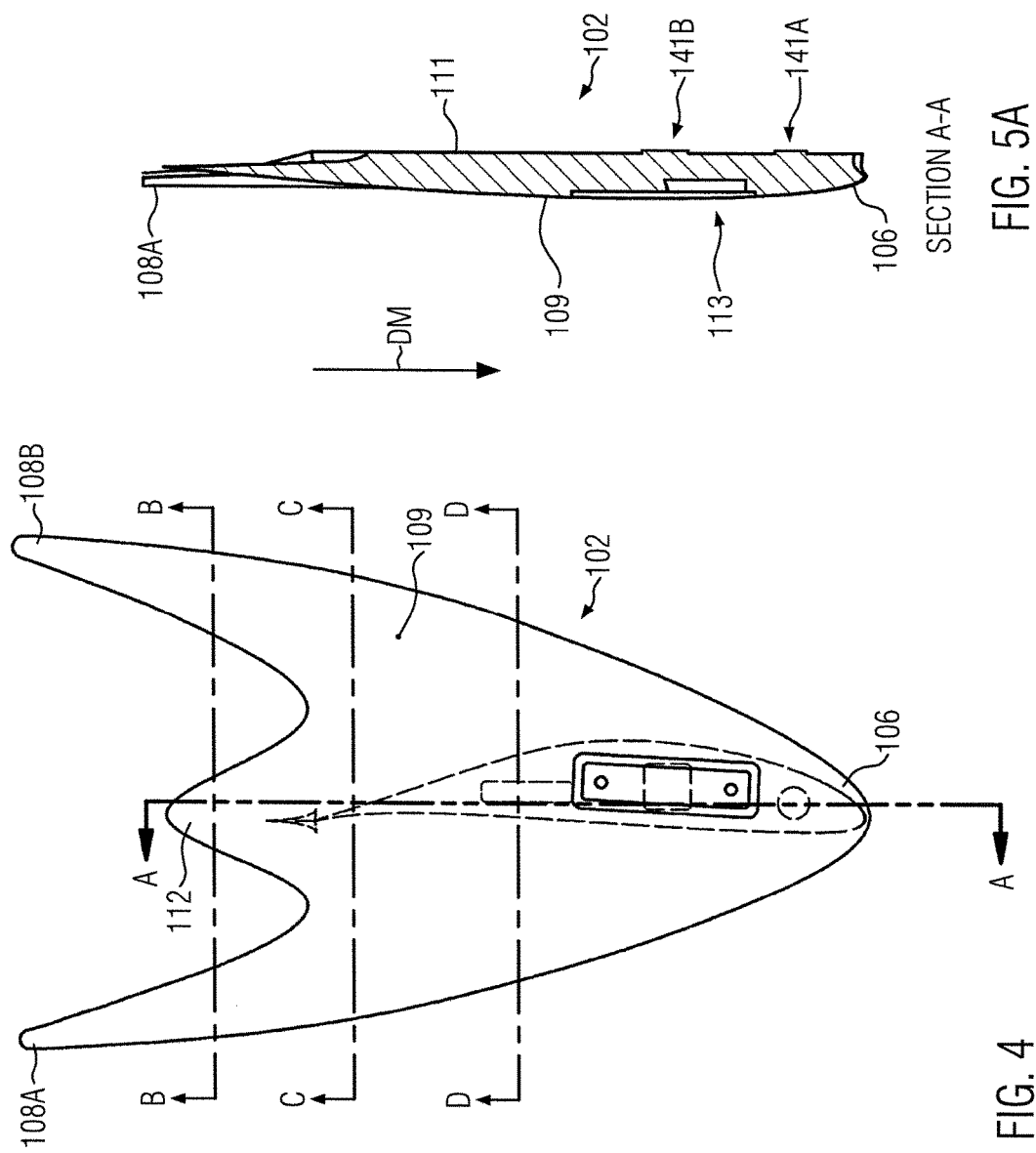
FIG. 4 shows an enlarged view of FIG. 2.

In the following an embodiment of the present subject matter is explained based on the drawings. It is noticed that the drawings show a specific embodiment as explained below and further alternative modifications as specified in the description are at least in part not illustrated. Further, same reference signs used in the Figures denote same components.

Embodiment

An embodiment of a mountable wing tip device 102 of the present subject matter is shown in FIGS. 1 and 2 in a three-dimensional view and a top-view, respectively.

The wing tip device 102 comprises a forward extremity 106 and three rearward extremities: including a first rearward extremity 108A, a second rearward extremity 108B and a third rearward extremity 112. The forward extremity 106 and two of the rearward extremities 108A and 108B are triangularly arranged. Between the two rearward extremities, in particular in the middle of the first and second rearward extremities 108A and 108B, the third rearward extremity 112 is positioned.

The forward extremity 106 and two of the rearward extremities 108A and 108B are arranged in a triangle which means that the distance between the forward extremity 106 and the rearward extremities 108A, B is similar. However, the distance between the third rearward extremity 112 and the forward extremity 106 comprises a shorter length than the distance between the forward extremity and the first and second rearward extremities 108A, B.

The mountable wing tip device 102 also comprises a leading edge region which extends between the forward extremity 106 and the first and second rearward extremities 108A, 108B. Further, a trailing edge region is defined extending between the first, second, and third rearward extremities 108A-112-108B.

For enhancing the airflow around the mountable wing tip device 102 the leading edge region comprises an arced tip portion at the forward extremity 106, wherein the trailing edge region extending between the first and second rearward extremities 108A, B comprises a "W"-shape. The trailing edge region is indicated in FIGS. 1 and 2 with 110A on the left side and adjacent to the first rearward extremity 108A, wherein the trailing edge region is indicated with 110B on the right side and adjacent to the second rearward extremity 108B.

In other words, with regard to FIG. 1, the mountable wing tip device 102 comprises substantially—when looking from the top—a shape like a half-ellipse from which a rounded "W" is cut out at the one end at which the so called minor axis or conjugate diameter of an ellipse is positioned.

In this "W"-shaped cut-out the two curved rounds building the lowest points in the "W" are nearer to the forward extremity 106 than the rearward extremity 112.

As can be further seen in FIG. 1, the forward extremity 106 is oriented into the direction of movement DM of the wing tip device 102. Consequently, the rearward extremities are oriented into the opposite direction of the direction of movement of the wing tip device 102.

FIG. 1 shows also a root region 113 which is positioned between the leading edge region and the trailing edge region, in more detail, between the extremities 106 and 112 at which the wing tip device 102 is mountable on an end of a rotor blade.

The root region 113 comprises a rectangular shaped recess which gives access to two holes 122, 122 extending through the wing tip device 102 enabling mounting of the wing tip device to a rotor blade e.g. by screws.

Figure 11:
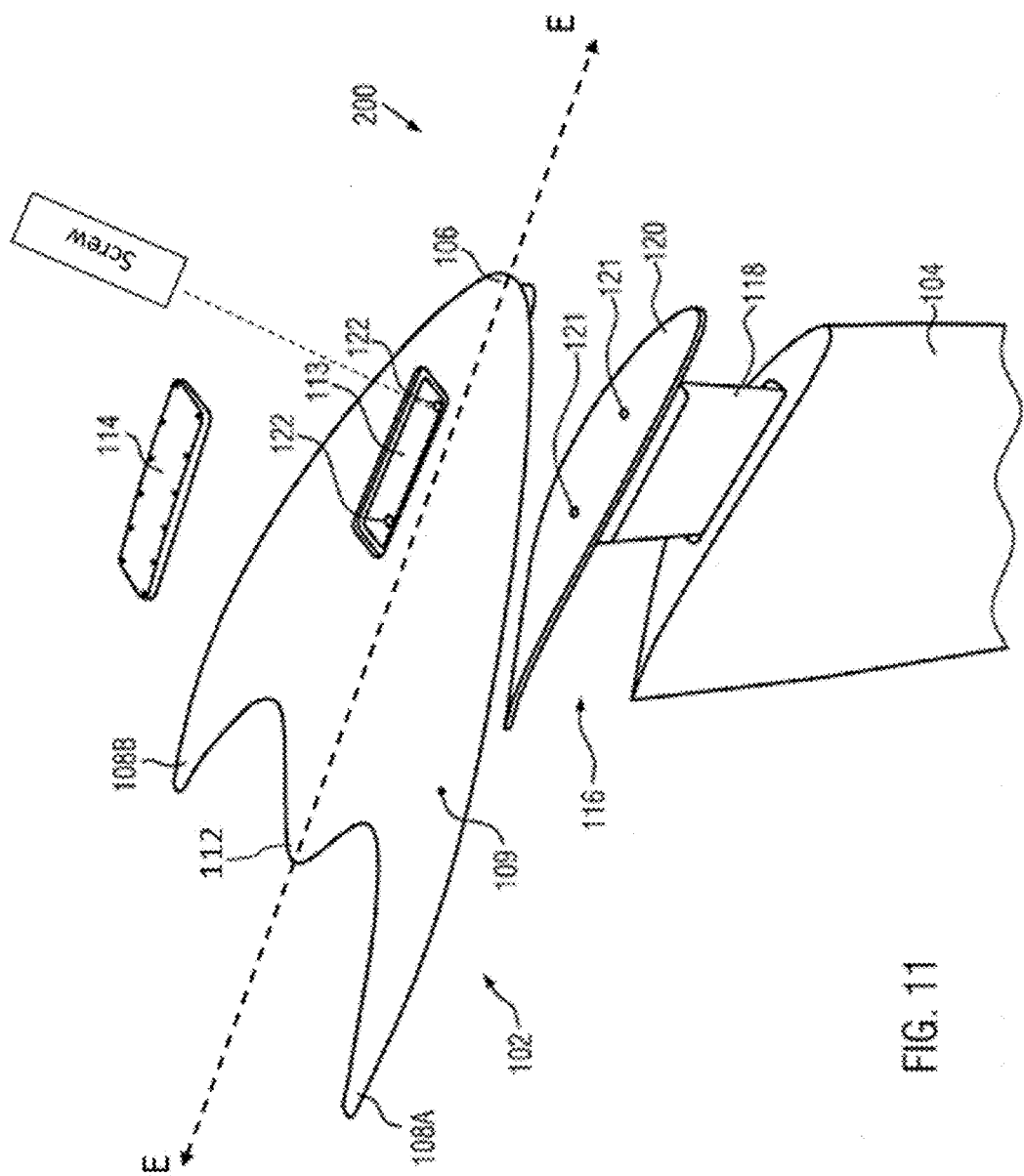
FIG. 11 shows a blade tip assembly together with a rotor blade and
FIG. 12 shows a wind turbine arrangement with a blade tip assembly in a three-dimensional view.

The rectangular shaped recess 113 can be closed by an element 114 fitting into the shape of recess in the mountable wing tip device 102 so that no additional friction during use of the wing tip device is produced (see also FIG. 11).

FIG. 2 shows the wing tip device 102 from the top. Moreover, a rotor blade 104 and a wing tip connecting portion 120, respectively, are shown dashed in FIG. 2. The wing tip connecting portion 120 comprises three cavities between the extremities 106 and 112. The first cavity 130 adjacent to the forward extremity 106 is circularly shaped, the second one 131 positioned in the middle of the root region is rectangularly shaped and the third one 132 comprises a long drawn out rectangularly shape which is adjacent to the root region 113 of the mountable wing tip device 102. The two through holes 122 are positioned between the long drawn out rectangularly shaped cavity 132 and the rectangular shaped cavity 131 as well as between the rectangular shaped cavity 131 and the circular one 130.

Further, with regard to FIG. 2, the airfoil of the rotor blade 104 and the wing tip connecting portion 120, respectively, is arranged such that its suction side is on the same as the second rearward extremity 108B wherein the pressure side is on the same side as the first rearward extremity 108A. The end of the airfoil is sharp-ended and is directed to the third rearward extremity 112. Opposite to the sharp-ended third rearward extremity 112, the airfoil comprises a curved nose which is positioned in the arced tip portion at the forward extremity 106.

In FIG. 3 the wing tip device 102 extends perpendicular to the projection plane wherein the forward extremity 106 is oriented into the direction of movement DM of the mountable wing tip device 102. As can be seen, the first rearward extremity 108A is inclined upwardly whereas the second rearward extremity 108B is inclined downwardly. Thus, the first and second rearward extremities 108A, 108B are inclined to opposite directions. Hence, from a back view the mountable wing tip device 102 comprises an "S"-shaped end and an "S"-shaped trailing edge, respectively.

In other words, the second rearward extremity 108B and its corresponding trailing edge region 110B are bent and are inclined, respectively, downwardly into the direction of the suction side of the rotor blade 104, wherein the first rearward extremity 108A and its corresponding trailing edge region 110A is bend and inclined, respectively, upwardly away from the pressure side of the moveable wing tip device 102.

FIG. 3 shows further that the airfoil of the wing tip device 102 cladded by an inner 111 and an outer surface 109 wherein the inner surface is directed towards a rotor blade 104 and the outer surface 109 is directed away from the rotor blade.

FIG. 4 is similar to FIG. 2, but shows additionally an intersecting line A-A. The sectional view resulting from the intersecting line A-A of FIG. 4 is shown in FIG. 5.

Figure 5:
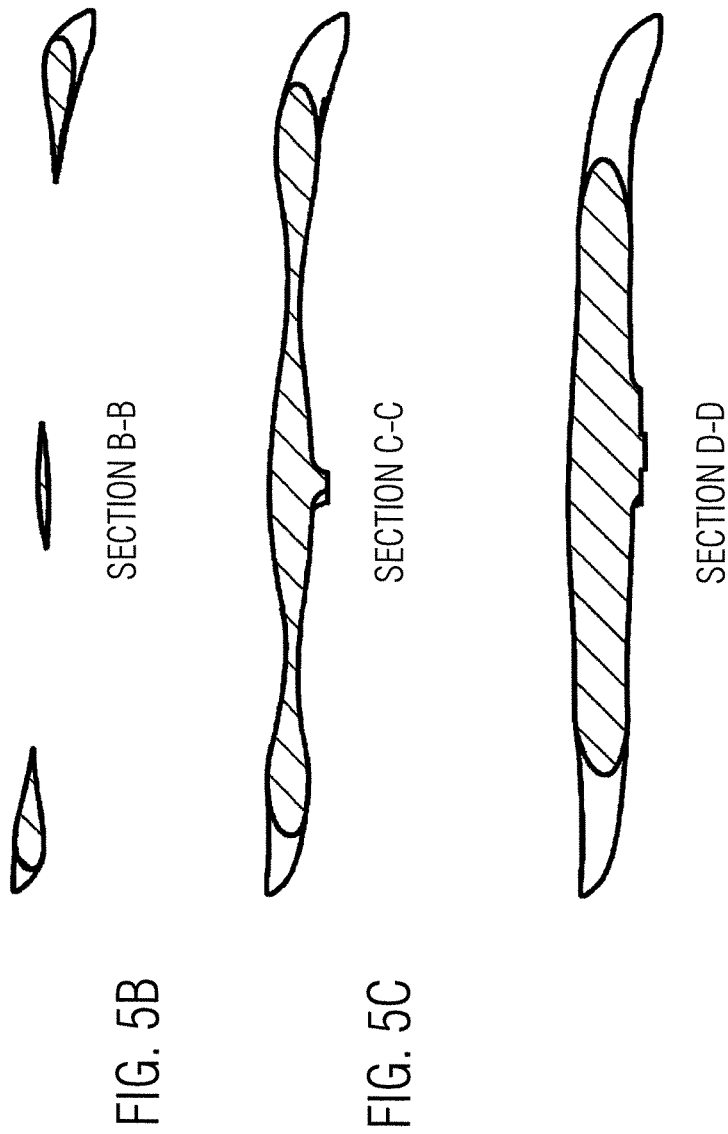
FIG. 5A shows a sectional view along line A-A of FIG. 4.
FIG. 5B shows a sectional view along line B-B of FIG. 4.
FIG. 5C shows a sectional view along line C-C of FIG. 4.
FIG. 5D shows a sectional view along line D-D of FIG. 4.

In FIG. 5A, the root region 113 is shown and extends into the airfoil of the mountable wing tip device 102. As already previously explained, the root region 113 is rectangularly shaped and comprises a recess which grants access to two holes 122, 122 extending through the wing tip device 102 (not shown in FIG. 5). Further, the mountable wing tip device is solid and, in particular made of aluminum or other light alloys. It is also possible that the wing tip device is made of a fiber reinforced material.

As can also be seen in FIG. 5, opposite to the recess of the root region 113 there are two protrusions 141A, 141B positioned. Due to the intersecting line A-A in FIG. 4 not all protrusions 141A, B, C are depicted. Theses protrusions 141A, B, C are positioned on the side and the inner surface 111, respectively, of the mountable wing tip device 102 at which the rotor blade 104 is fixed.

As previously explained, the rotor blade 104 has three cavities between the extremities 106 and 112. These cavities are circularly, rectangularly and long drawn out rectangularly shaped. The above mentioned protrusions 141A, B, C comprise corresponding shapes and fit into the cavities 130, 131, 132 of the rotor blade 104. This allows an easy positioning of the mountable wing tip device 102 to a rotor blade 104. Further, due to the form fit of the protrusions of the mountable wing tip device and the cavities of the rotor blade it is easily possible to fix the wing tip device to the rotor blade e.g. by screws extending through the holes 122, 122. Then, due to the form fit the holes can be coaxially positioned so that the insertion of screws can be easily done. FIGS. 5B, 5C and 5D sectional views along lines B-B, C-C and D-D of FIG. 4 are shown. In FIG. 5B it is shown that the rearward extremities incline into opposite directions, wherein in FIG. 5C the course of the thickness of the airfoil of the wing tip device along the intersecting line C-C of FIG. 4 is depicted. Thus, it is shown the airfoil comprises a minimum in thickness between two adjacent rearward extremities (108A, 108B, 112) as well as a maximum in thickness of the airfoil between the forward extremity (106) and a rearward extremity (108A, 108B, 112). Moreover, FIG. 5D illustrates that the thickness along the intersecting line D-D in FIG. 4 is mainly constant.

Figure 6:
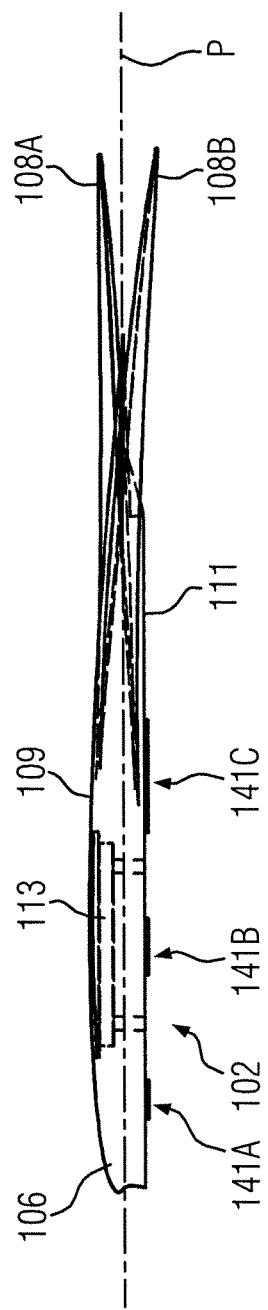
FIG. 6 shows a side view of the mountable wing tip device.

FIG. 6 shows the mountable wing tip device 102 in a side view with the forward extremity 106 and both rearward extremities 108A, 108B. As can also be seen in FIG. 6 the root region 113 is shown with a dashed-line as well as the both holes extending through the mountable wing tip device 102. On the bottom of the mountable wing tip device 102 there are three protrusions, namely a circular one 141A, a rectangular one 141B and an elongated rectangular one 141C. These three protrusions fit into a blade portion 116 which will be described later in FIGS. 7 and 8.

As also can be seen from FIG. 6, the thickness of the airfoil at the forward extremity 106 decreases while extending to a rearward extremity 108A, 108B, 112. Moreover, also the thickness of the leading edge region decreases while extending to the trailing edge region (not shown in the Figures). Further, the airfoil between two rearward extremities is lower than the airfoil at the rearward extremities. In other words, the airfoil at the beginning of the mountable wing tip device 102 and at the forward extremity 106 is getting thinner with respect to the rearward extremities 108A, 108B, 112. At the same time the thickness of the airfoil between the leading edge region and the trailing edge region decreases. This means with regard to FIG. 2 that the nearest points of the "W"-shaped cut-away of the ellipse to the forward extremity 106 are positioned in a valley in which the profile and the airfoil, respectively, of the mountable wing tip device 102 comprises its thinnest region.

At the forward extremity 106 and at the arced tip portion, respectively, the wing tip device 102 comprises a nose which protrudes into the direction of movement DM of the wing tip device 102. This nose enhances the airflow around the wing tip device and from the forward extremity 106 to the rearward extremities 108A, 108B, 112. This reduces drag of the mountable wing tip device and thus also enhances the efficiency in reducing friction.

In other words, the mountable wing tip device comprises its largest thickness in the region of the forward extremity 106 and, the thickness at the forward extremity 106 is reduced while extending into the direction of the region of the rearward extremity. Further, the thickness of the airfoil varies along the chord line which is a straight line connecting the leading and trailing edges of the airfoil. Moreover, the thickness of the airfoil of the mountable wing tip device 102 varies from thin to thick and subsequently to thin. As shown in FIG. 6 the airfoil comprises a thin beginning—the above mentioned nose—at the leading edge and the forward extremity, respectively, which expands to a thick area of the leading edge. Subsequently, the airfoil gets thin while extending to the trailing edge. Referring to FIGS. 4, 5A-C, and 11, the forward extremity (106) and the third rearward extremity (112) are arranged on a connection line E. and the airfoil of the wing tip device comprises a minimum thickness between the leading edge region and the connection line E.

Further, in FIG. 6 a main plane P is shown which is only depicted as a dashed straight line because it is oriented perpendicular to the projection plane. As shown, the first rearward extremity 108A is inclined upwardly away from the main plane P whereas the second rearward extremity 108B is inclined downwardly away from the main plane P. To be inclined away from the main plane means that mentioned first and second extremities 108A, B are at least partially outside of the main plane P. In other words, the first and second extremities 108A, B are not positioned within the main plane P.

FIG. 7 shows a blade portion 116 comprising a blade connecting portion 118 which connects the blade portion 116 to a rotor blade 104 and a wing tip connecting portion 120 which connects the blade portion 116 to the mountable wing tip device 102 (can also be seen in FIG. 11).

The wing tip connecting portion 120 has a circular opening 130, a rectangular opening 131 as well as an elongated rectangular opening 132 which can receive the protrusions 141A, B, C of the mountable wing tip device 102. The blade portion 116 comprises also two holes 121, 121 which can be coaxially arranged to the through hole of the wing tip device 102.

The blade connecting portion 118 comprises mainly a rough surface, in particular grooves 119 for facilitating alignment of a rotor blade of a wind turbine arrangement with the blade connecting portion 118. The blade connecting portion 118 also comprises a surface having no grooves which is adjacent to the wing tip connecting portion 120.

FIG. 8 shows the blade portion 116 of FIG. 7 in a side view showing that the surface having no grooves is approximately ⅙ of the length of the blade connecting portion 118. The other ⅚ of the length of the blade connecting portion 118 comprise a rough surface having grooves 119 as can be seen in detail in FIG. 9. As also can be clearly seen from FIG. 8, the blade connecting portion 118 extends from a baseplate 125. On the other side of the baseplate 125 the wing tip connecting portion 120 is positioned. The base plate is optionally and can be adapted e.g. to the shape of the airfoil of the rotor blade which allows an easy and exact positioning of the blade portion 116 in the rotor blade.

Further, in FIG. 8 the depth of the holes 121 is also depicted. The holes extend from the surface of the wing tip connecting portion 120 into the region at which the grooves 119 are arranged on the blade connecting portion 118. Moreover, shown dashed are the cavities 130, 131, 132.

FIG. 10 shows the blade portion 116 with a view to the direction of the blade connecting portion 118 which is depicted in thick dash dotted lines, Here, also the holes 121, 121 are shown. Also shown in dashed-line is the baseplate 125 and socket, respectively. Further, the cavities 130, 131, 132 in the wing tip connecting portion 120 are shown.

FIG. 11 shows a blade tip assembly 200 comprising the blade portion 116 and a mountable wing tip device 102. The blade connecting portion 118 comprises two ends, one end being mounted at the root region 113 of the mountable wing tip device 102 and the other end being mountable on a rotor blade 104.

As can be seen in FIG. 11, the blade connecting portion 118 fits into a rotor blade 104 of a wind turbine arrangement (not shown). The mountable wing tip device 102 is fitted onto the wing tip connecting portion 120 over the holes 121, 121 and the holes 122, 122 of the wing tip device 102 wherein both holes 121/121 and 122/122 are positioned coaxially.

The wing tip connecting portion 120 shown in FIG. 11 comprises no cavities in comparison to the wing tip connecting portion 120 depicted in FIG. 7. However, also an exact positioning of the wing tip device 102 is possible with regard to the coaxial positioning of the holes as described before. Further, it is of course possible that the wing tip connecting portion 120 of FIG. 11 can also provide cavities 130, 131, 132 as shown in FIG. 7.

For fixing the mountable wing tip device 102 to the rotor blade 104 of a wind turbine, screws can be inserted into the holes 122, 121 for generating a force pressurizing the wing tip device 102 onto the end of the rotor blade 104.

Further, as a rotor blade 104 of a wind turbine is commonly made of fiber reinforced materials it is preferred that the wing tip connecting portion 118 comprises grooves. Due to the grooves the wing tip connecting portion 118 can be easily bonded to the rotor blade 104. For bonding preferably a resin is used which is subsequently cured so that a highly reliable connection between the mountable wing tip device 102 and the rotor blade can be achieved. Especially for bonding a large surface is preferred as this enhances the contact area of the parts to be bonded.

After fixing the blade portion 116 to the rotor blade 104 the mountable wing tip device 102 is fixed by e.g. screws inserted into the holes 121 and 122. Subsequently, the rectangular shaped recess of the root region 113 in the mountable wing tip device 102 is closed with an element 114 fitting into the recess. The element 114 is fixed via several screws.

Figure 12:
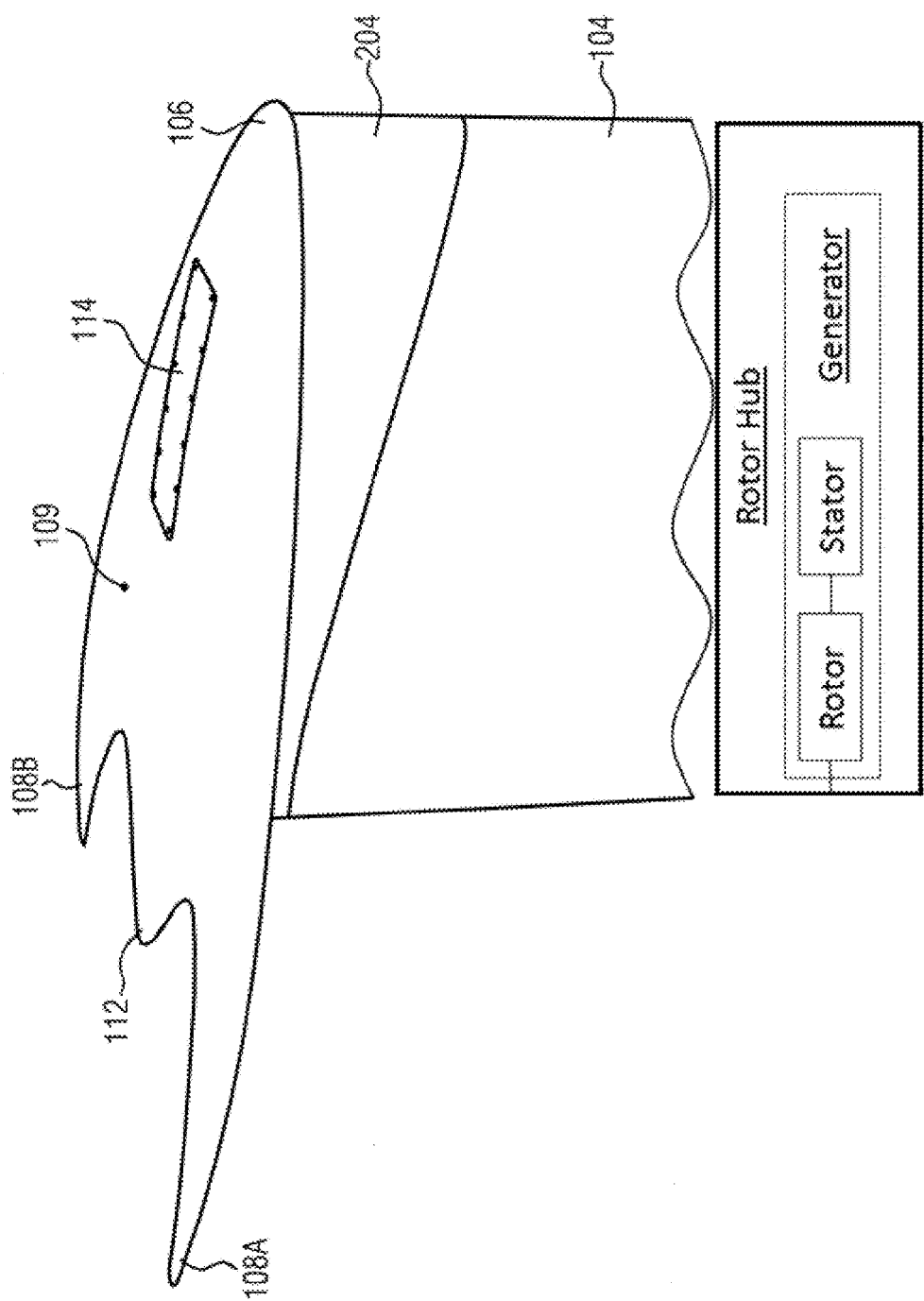

FIG. 12 shows an assembled wing tip assembly 200 similar to FIG. 11 wherein the element 114 is positioned into the rectangular opening of the root region 113 of the mountable wing tip device 102 and wherein the mountable wing tip device 102 is fixed to the rotor blade 104.

However, in FIG. 12 a further embodiment of the present invention is shown wherein an extension part 204 is integrally formed with the mountable wing tip device 102. This part has the same shape as the rotor blade 104. Thus, an adaption in the correct orientation of the wing tip device 102 can be easily done.

The fixing of the mountable wing tip device 102 having the integrally formed extension part 204 can also be done by screws inserted into holes in the opening of the root region 113.

LIST OF REFERENCE SIGNS

102 MOUNTABLE WING TIP DEVICE
104 ROTOR BLADE
106 FORWARD EXTREMITY
108A REARWARD EXTREMITY
108B REARWARD EXTREMITY
110A TRAILING EDGE REGION
110B TRAILING EDGE REGION
112 REARWARD EXTREMITY
113 ROOT REGION
114 ELEMENT
116 BLADE PORTION
118 BLADE CONNECTING PORTION
119 GROOVES
120 WING TIP CONNECTING PORTION
121 HOLE
122 HOLE
125 BASEPLATE
130 CIRCULARLY SHAPED CAVITY
131 RECTANGULARLY SHAPED CAVITY
132 LONG DRAWN OUT RECTANGULARLY SHAPED CAVITY
141A, B, C PROTRUSION
200 BLADE TIP ASSEMBLY
204 EXTENSION PART
DM DIRECTION OF MOVEMENT
P MAIN PLANE

The invention claimed is:

1. A mountable wing tip device for mounting on a rotor blade of a wind turbine, the mountable wing tip device comprising:
   a) a forward extremity and at least three rearward extremities including a first rearward extremity, a second rearward extremity, and a third rearward extremity,
   b) wherein the forward extremity and two of the first, second and third rearward extremities are triangularly arranged,
   c) a leading edge region extending between the forward extremity and two of the first, second and third rearward extremities, and d) a trailing edge region extending between the first, second, and third rearward extremities, and
e) a root region at which the wing tip device is mountable on an end of the rotor blade,
f) wherein the root region is positioned between the leading edge region and the trailing edge region
wherein the root region comprises: a rectangular shaped recess, and two holes extending through the wing tip device and opening into the recess such that the two holes are each configured to receive a screw mounted to the rotor blade.

2. The mountable wing tip device according to claim 1, wherein the leading edge region comprises a V-shape, and a length between one of the first and second rearward extremities and the forward extremity differs from a length between the forward extremity and the third rearward extremity.

3. The mountable wing tip device according to claim 1, wherein the leading edge region comprises an arced tip portion at the forward extremity.

4. The mountable wing tip device according to claim 1, wherein a profile of the wing tip device defines an airfoil extending from the forward extremity to the rearward extremities and comprising a maximum thickness disposed between the forward extremity and the first, second, and third rearward extremities.

5. The mountable wing tip device according to claim 4, wherein the maximum thickness of the airfoil is closer to the forward extremity than to any of the first, second, and third rearward extremities.

6. The mountable wing tip device according to claim 4, wherein the forward extremity and the third rearward extremity of the wing tip device are arranged on a connection line, and wherein the airfoil comprises a minimum thickness between the leading edge region and the connection line.

7. The mountable wing tip device according to claim 1, wherein a profile of the wing tip device defines an airfoil extending from the forward extremity toward the rearward extremities and comprising a minimum thickness disposed between two adjacent rearward extremities.

8. The mountable wing tip device according to claim 1, wherein the trailing edge region comprises a 'W'-shape having the first, second, and third rearward extremities and two curved rounds such that each curved round is disposed between adjacent rearward extremities and projects toward the forward extremity.

9. The mountable wing tip device according to claim 1, wherein the forward extremity and third rearward extremity are arranged in a main plane P, and the first and second rearward extremities are inclined away from the main plane P, such that the first and second rearward extremities are not disposed in the main plane P.

10. The mountable wing tip device according to claim 9, wherein the first and second rearward extremities disposed at opposing ends of the trailing edge are inclined in opposite directions with respect to the main plane P.

11. The mountable wing tip device according to claim 1, wherein at least one of the first and second rearward extremities is inclined with respect to a plane spanned by the other one of the first and second rearward extremities, the third rearward extremity, and the forward extremity.

12. A wind turbine arrangement comprising:
a rotor hub being coupled with at least one rotor blade comprising a suction side and a pressure side;
a generator having a rotor and a stator, the rotor having mounted thereupon the rotor hub, and being rotatably supported on the stator; and
a blade tip assembly comprising a mountable wing tip device according to claim 1, wherein at least one of the first and second rearward extremities is inclined with respect to a plane spanned by the other one of the first and second rearward extremities, the third rearward extremity, and the forward extremity,
wherein the mountable wing tip device is mounted to an end of a respective rotor blade, such that one of the rearward extremities inclines towards the suction side of the respective rotor blade and another one of the rearward extremities inclines towards the pressure side of the respective rotor blade.

13. The wind turbine arrangement according to claim 12, wherein the first rearward extremity extends toward the suction side of the respective rotor blade and the second rearward extremity extends toward the pressure side of the respective rotor blade.

14. The wind turbine arrangement according to claim 12, wherein a profile of the rotor blade defines an airfoil comprising a maximum thickness that is disposed between the forward extremity and a respective rearward extremity of the mountable wing tip device.

15. The wind turbine arrangement according to claim 14, wherein the maximum thickness of the airfoil of the rotor blade is located closer to the forward extremity than any of the first, second and third rearward extremities.

16. A blade tip assembly comprising a blade portion and a mountable wing tip device for mounting on a rotor blade of a wind turbine, the mountable wing tip device comprising:
a) a forward extremity and at least three rearward extremities including a first rearward extremity, a second rearward extremity, and a third rearward extremity,
b) wherein the forward extremity and two of the first, second and third rearward extremities are triangularly arranged,
c) a leading edge region extending between the forward extremity and two of the first, second and third rearward extremities, and
d) a trailing edge region extending between the first, second, and third rearward extremities, and
e) a root region at which the wing tip device is mountable on an end of the rotor blade,
f) wherein the root region is positioned between the leading edge region and the trailing edge region
wherein the blade portion comprises a blade connecting portion which connects the blade portion to the rotor blade and a wing tip connecting portion which connects the blade portion to the mountable wing tip device.

17. The blade tip assembly according to claim 16, wherein the blade connecting portion comprises a rough surface for facilitating alignment of the rotor blade of the wind turbine with the blade connecting portion and the mountable wing tip device.

18. The blade tip assembly according to claim 17, wherein the rough surface comprises grooves.

19. The blade tip assembly according to claim 16, wherein the blade connecting portion comprises two ends, one end being mounted at the root region of the mountable wing tip device and the other end being mountable at the rotor blade.

20. The blade tip assembly according to claim 16, wherein the blade connecting portion comprises at least one extension part extending between the wing tip device and the rotor blade, wherein the shape of the extension part corresponds to the shape of the rotor blade.

21. The blade tip assembly according to claim 16, wherein the blade connecting portion extends through the mountable wing tip device and includes screws for clamping the mountable wing tip device towards an end of the rotor blade of the wind turbine when mounted.

\* \* \* \* \*